Aug. 28, 1934.　　　B. TYLER　　　1,971,883
VENDING MACHINE
Filed Sept. 18, 1933　　2 Sheets-Sheet 1
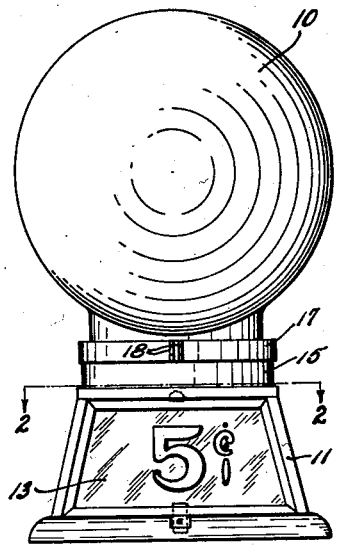
Fig.~1.
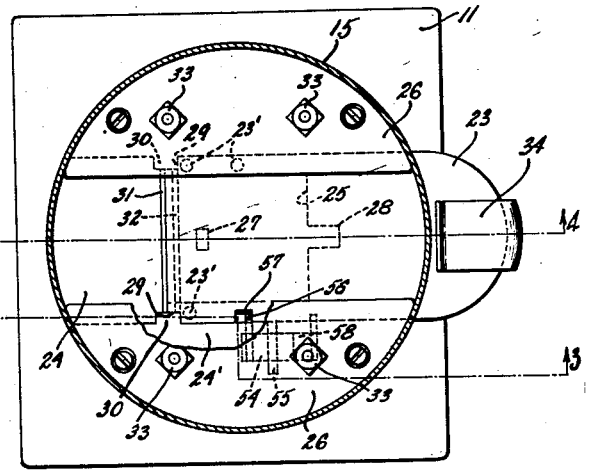
Fig.~2.
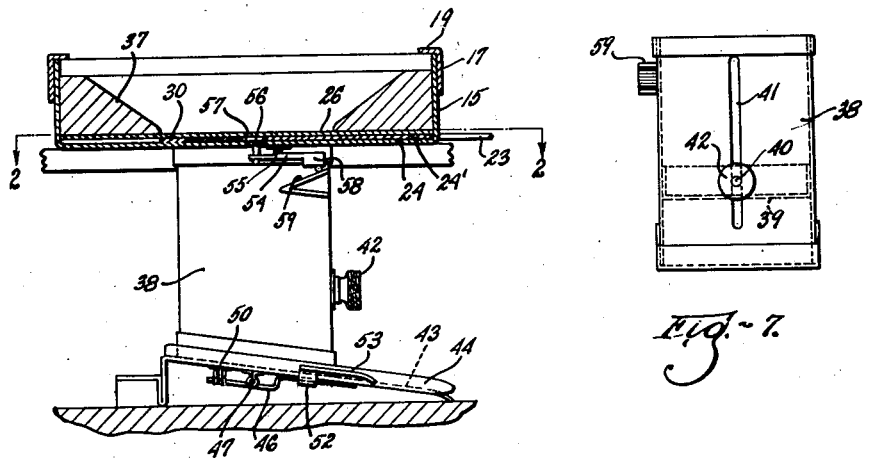
Fig.~3.
Fig.~7.
INVENTOR
BENJAMIN TYLER
BY
Brockett, Hyde, Higley & Meyer
ATTORNEYS Aug. 28, 1934.  B. TYLER  1,971,883
VENDING MACHINE
Filed Sept. 18, 1933    2 Sheets-Sheet 2
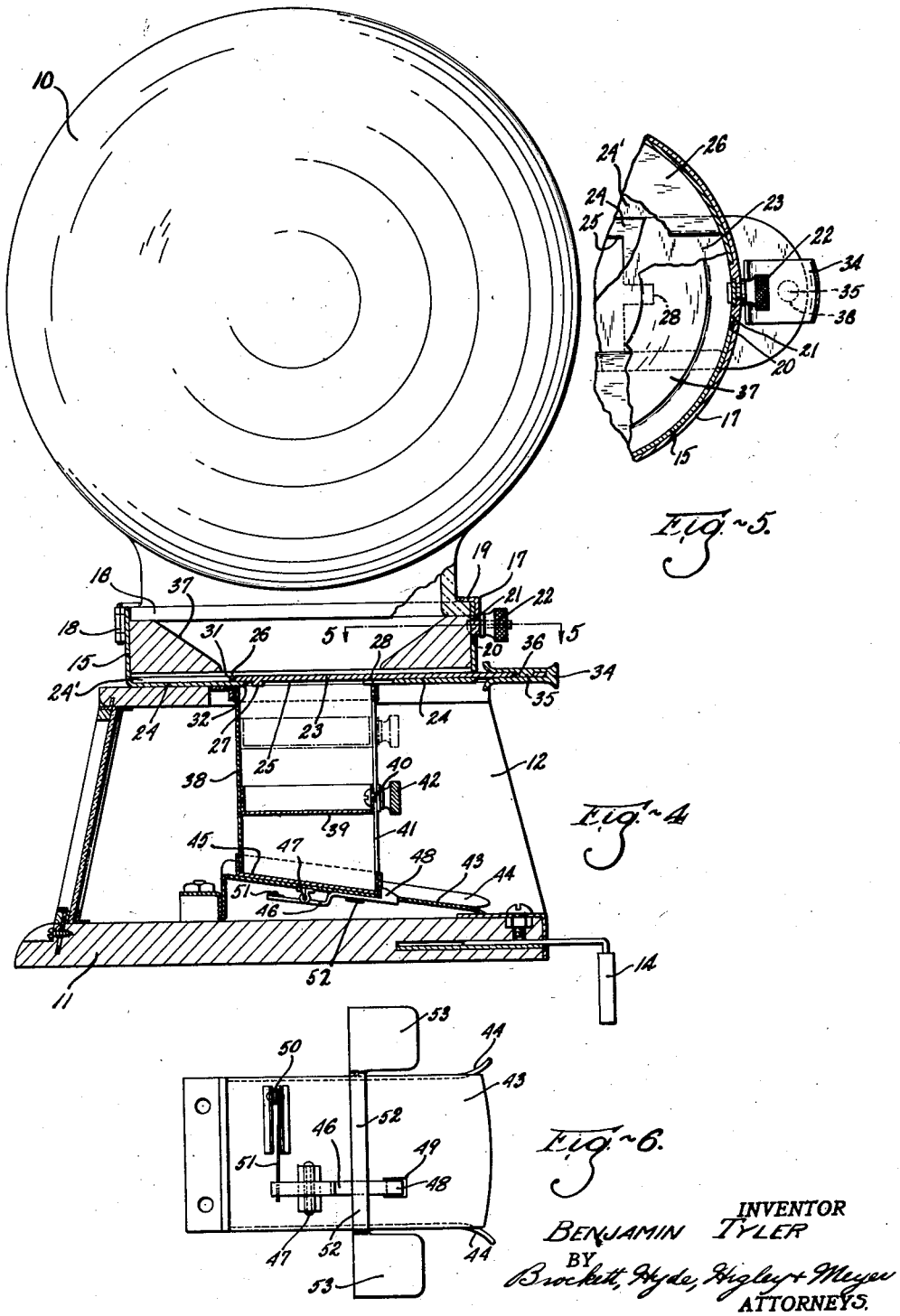
INVENTOR
BENJAMIN TYLER
BY
ATTORNEYS.

Patented Aug. 28, 1934

1,971,883

UNITED STATES PATENT OFFICE 1,971,883

VENDING MACHINE

Benjamin Tyler, East Cleveland, Ohio

Application September 18, 1933, Serial No. 689,860

11 Claims. (Cl. 221—114)

This invention relates to a vending device and more particularly, to a machine having a container for small articles and means for measuring small quantities of said articles by volume as the articles are removed from the container.

In vending food products of small size, such as certain types of candy, nuts and the like, it is desirable to store such products previous to sale in a manner to protect them from deterioration and at the same time in a manner to display them to attract trade.

An object of my invention is to so store small food articles and to provide a very simple means for removing small quantities and measuring them at the time a sale is made.

Another object of the invention is to provide a novel measuring cup with means for varying its volumetric capacity according to the article sold, or according to the varying price at different times.

Another object of the invention is to provide an interlock between the outlet gate of the container and the measuring cup, whereby the container outlet will be closed except when the measuring cup is in place therebeneath.

Another object of the invention is to provide means for automatically disengaging the above mentioned interlock by the placing of the measuring cup beneath the container outlet.

A further object of the invention is to provide a guiding surface for guiding the measuring cup into place beneath the container, means for latching the cup in position, and a very efficient unlatching means operable by either hand of an operator when the measuring cup is removed.

A still further object of the invention is to provide a camming surface for guiding the measuring cup into close contact with the walls about the mouth of the container outlet.

Other objects and advantages of my invention, such as arrangements for assembling and disassembling the parts and regulating the movements thereof, will be apparent from the following description and the accompanying drawings, in which Fig. 1 is an elevation of my improved vending machine; Fig. 2 is a sectional view, partly broken away, along the lines 2—2 of Figs. 1 and 3; Fig. 3 is a partial sectional view along the line 3—3, of Fig. 2; Fig. 4 is a sectional view along the line 4—4 of Fig. 2; Fig. 5 is a partial sectional view, partly broken away, along the line 5—5 of Fig. 4; Fig. 6 is a bottom view of the guiding surface beneath the measuring cup; while Fig. 7 is a front elevation of the measuring cup shown in side elevation in Fig. 3 and in section in Fig. 4.

My device comprises a container 10 preferably of glass where it is desired to display the contents of the container for the purpose of attracting trade. This container may be globular or cylindrical or any other desired form, and is placed with its outlet extending downwardly. Beneath the container I provide a base 11 wherein is provided space for housing a measuring device for measuring articles removed from the container outlet, and one side of the base, indicated at 12, Fig. 4, is open to permit ready access within said base. The front wall of the base 13 serves to support an advertising panel illuminated or otherwise, if desired. The base is also provided preferably with members 14 of a suitable nature for retaining the base in position upon a table or counter.

For retaining the container in position upon the base I provide a supporting ring 15 mounted upon the base and means for retaining the container in position within the supporting ring so that the container may be easily removed for washing, refilling, or replacement. The retaining means illustrated comprises a projecting portion 16 on that part of the container engaging the support and metallic members 17 having spring characteristics and substantially conforming to the contour of the portion of the container engaging the support. These metallic members, as illustrated, are substantially semi-circular in shape and are pivotally supported at 18 on the ring 15 and are provided with flanges 19 adapted to overhang the projection 16 of the container. The retaining rings 17 engage the support at a point substantially diametrically opposite the pivot 18 and at this point I provide interfitting parts to retain the rings and support in engagement, the parts being so constructed that the retaining ring is sprung out of its normal contour to engage said interfitting parts. In Fig. 5 I have illustrated the interfitting parts as comprising openings 20 in the support 15 and projections 21 on the rings 17 which are snapped in place by springing the ring members 17, and are retained firmly in place by a knurled nut 22 in threaded engagement with the support 15.

The container 10 is placed with its outlet extending downwardly and the support 15 is provided with a suitable gate for controlling the flow of articles through the outlet. The structure disclosed comprises a gate member 23 with suitable guiding surfaces above and below the gate. The lower surface comprises a plate 24 which is cut away as at 25, best seen in Fig. 5, to provide an outlet through said plate. The upper surfaces comprise two segments 26 adapted to overlie the lateral edges of gate 23. A spacing plate 24' separates the upper and lower surfaces. The gate 23 is preferably provided with a cutting edge 31 adapted to coact in a shearing manner with a similar edge 32 provided on the underlying plate 24. It will be understood that the cutting edge 32 might be arranged as a removable blade although I have indicated in Fig. 4 that such cutting edge may be formed as an integral portion of plate 24 which in turn may be integral with the upstanding walls of the general support 15. Means is provided for limiting the reciprocating movement of the gate transversely of the outlet, the embodiment shown comprising a projection 27 on the under side of the gate and a notch 28 in plate 24 for limiting the movement in one direction, and notches 29 adjacent the cutting edge of the gate adapted to contact shoulder members 30 which may be conveniently arranged as lateral projections on the plate 24'.

To permit the ready removal of the gate 23 and access to the other working parts the overlying plate segments 26 are preferably removably secured to the support 15 by bolts 33. On account of the arrangement of the stop members 27 and 28 it will be apparent that the gate 23 must be removed from within the support 15 and therefore a grip 34 is supplied at the outer end of the gate 23 which is readily removable to permit the gate to be withdrawn inwardly. The form of grip illustrated is clearly seen in Fig. 4 as comprising a substantially U-shaped member having portions adapted to lie above and below gate 23 and having spring characteristics forcing these two portions toward each other so that a projection 35 on one of the branches of the U-member enters a recess 36 in the gate 23. The grip is therefore easily removable from the gate. For guiding the articles within the container toward the outlet and gate thus provided, I show a deflecting member 27 adapted to overlie the segmental plates 26.

If desired, small holes 23' may be cut through plate 24 adjacent the cut-off position of gate 23 to keep the gate slide free of crumbs and the like.

I have provided a measuring device in the form of a cup 38 adapted to be placed adjacent the container outlet and this cup is preferably arranged with a false bottom 39 which may be adjusted vertically to vary the measuring capacity of the cup. The adjusting means shown comprises a stud 40 extending from the false bottom through a slot 41 in the wall of the cup and a knurled nut 42 arranged to clamp the stud against the wall of the cup.

For guiding the cup in place beneath the container outlet I provide a guiding surface 43 having upstanding side flanges 44. Preferably this surface is inclined upwardly toward the bottom of the container and the measuring cup 38 is provided with an inclined bottom 45 conforming to the slope of the guiding surface 43, and arranged in a manner to cam the cup 38 toward the container outlet, so that in its filling position beneath the outlet, it is firmly held against the wall surrounding the outlet and in this case firmly against the under surface of plate 24.

I have also shown a latching device for retaining the cup in its filling position until the operator desires to remove it. This latching device is clearly shown in Figs. 3, 4 and 6 and comprises a lever 46 pivotally supported at 47 beneath the guiding surface 43 and having a projection 48 on one end of the lever adapted to extend above the guiding surface 43, through an opening 49 therein, to contact a portion of cup 38 and retain it in its filling position. The opposite end of lever 46 is provided with means for yieldingly holding the lever in a position with the projection 48 normally upward. The yielding means shown comprises a coil spring 50 having an arm 51 bearing downwardly on the end of lever 46. For releasing the latch member 48 I provide finger contacts in position to be engaged by the hand of an operator, and preferably with one contact on each side of the measuring cup so that the contacts are readily engaged whichever hand of the operator is used to remove the measuring cup. To this end the lever 46 is provided with laterally extending arms 52 and finger contacts 53 upon either side of guiding surface 43.

I provide interlocking means between the gate 23 and the measuring cup 38 so that the gate may not be opened except when the cup is in filling position. For this purpose I have disclosed a latch member 54 pivotally supported at 55 adjacent the container outlet, the latch member having a member 56 extending laterally and then upwardly to enter a notch 57 in gate 23. On the side of pivot 55 opposite the projecting member 56 is provided a weight 58 which yieldingly urges the projection 56 normally upward to engage the notch 57, although it will be understood that other means might be provided for yieldingly urging the members into latching position. For automatically releasing this interlocking latch upon placement of the cup in filling position I provide a cam 59 carried by the cup 38 and adapted to engage the weight 58 and lift it upwardly as the cup moves into filling position, thus moving the projection 56 downwardly and disengaging it from the notch 57 in the gate 23. This permits the opening of gate 23 for the purpose of filling the cup.

It will thus be seen that I have provided an efficient device for storing food articles in an accessible and attractive manner and for readily removing small measured quantities therefrom intermittently as desired. Means is provided for insuring that the measuring cup is properly placed in position beneath the container outlet and firmly engaging the walls about said outlet and latched in said position before the filling gate can be opened. Also I have provided very simple but efficient means for unlatching such cup for removal. The vending device disclosed is, therefore, substantially foolproof.

What I claim is:

1. In a vending machine, the combination of a container having a downwardly extending opening, a measuring device adapted to enclose said opening, and cam means arranged to force said device toward said opening when the device is moved therebeneath.

2. In a vending machine, the combination of a container having a downwardly extending opening, a measuring cup adapted to fit thereunder, said cup having a sloping bottom and a false bottom adapted to vary the measuring capacity of the cup, and a guiding surface beneath the cup conforming to the slope of the cup bottom.

3. In a vending machine, the combination of a container having an outlet, a measuring cup adapted for placement adjacent said outlet, a guiding surface for the bottom of said cup, latch means yieldingly biased in a direction to retain said cup in place, and release means for said latch means, said release means having an actuating member on each side of said cup.

4. In a vending machine, the combination of a container having an outlet, a measuring cup adapted for placement adjacent said outlet, said cup having a sloping bottom, a guiding surface beneath the cup conforming to the slope of the cup bottom, and latch means for holding said cup in position adjacent the outlet comprising, a lever pivotally supported beneath said guiding surface, a projection on said lever adapted to extend above said surface, means for yieldingly holding said projection in extended position, and finger contacts extending laterally from said lever on each side of the guiding surface, said contacts being adapted to depress said lever and projection.

5. In a vending machine, the combination of a container having an outlet, means for opening and closing said outlet, a latch normally engaging said means in its closed position, a measuring device adapted for placement adjacent said outlet, and cam means on said device arranged to move said latch to inoperative position upon placement of said device adjacent said outlet.

6. In a vending machine, the combination of a container having an outlet, a measuring cup adapted for placement adjacent said outlet, a sliding gate for opening and closing said outlet, coacting latch members for maintaining said gate closed, one member on the gate and the other member pivotally supported adjacent said outlet, means for yieldingly holding said latch members in engagement, and means carried by the cup for releasing said latch members, said last-named means being operative upon placement of the cup adjacent said outlet.

7. In a vending machine, the combination of a container having a downwardly extending outlet, a measuring cup, means for guiding said cup beneath said outlet, a sliding gate for opening and closing said outlet, a deformation in said gate, a latch pivotally supported adjacent said outlet and having a portion adapted to engage said deformation, means for yieldingly engaging said latch in said deformation, and a cam carried by said cup and adapted to disengage said latch by movement of said cup beneath said outlet and along said guide.

8. In a vending machine, the combination of a container having an outlet, gate means for opening and closing said outlet, a measuring device, means for guiding said device into place adjacent said outlet, a latch adjacent said guide and adapted to engage a portion of said device to retain it when said device is moved into place, a second latch normally maintaining said gate means closed, and means carried by the device and arranged to release said second latch when said device is moved into place, whereby placing the device adjacent the outlet simultaneously latches the device in place and unlatches the gate means.

9. In a vending machine, the combination of a container, a support therefor, projections on the portion of the container engaging the support, a metallic member having spring characteristics and substantially conforming to the contour of the portion of the container engaging the support, said member having portions adapted to overlie the projections on the container, one end of said member being hinged to said support, the other end of said member being arranged to engage said support at a point, there being interfitting parts on said member and support at said point, and said parts being so arranged that said member is sprung out of its normal contour while engaging said interfitting parts.

10. In a vending machine the combination of a container having a downwardly extending outlet, a reciprocable gate adapted to close said outlet, guideways above and below the sides of said gate, and a hole through the lower guideway adjacent the inner end of said gate in its closed position, whereby small particles may fall free of said guideway.

11. In a vending machine, the combination of a container having an outlet, a measuring device adapted for placement outside said outlet, means for opening and closing said outlet at the will of the operator when said device is in place, and an interlock between said means and device constructed and arranged to prevent opening of said outlet except when said device is in place.

BENJAMIN TYLER.